(12) United States Patent
Madhava (10) Patent No.: US 7,645,485 B2
(45) Date of Patent: Jan. 12, 2010

(54) CHROMIUMM DIFFUSION COATINGS

(75) Inventor: Murali Madhava, Gilbert, AZ (US)

(73) Assignee: Honeywell International Inc., Morristown, NJ (US)

( * ) Notice: Subject to any disclaimer, the term of this patent is extended or adjusted under 35 U.S.C. 154(b) by 1221 days.

(21) Appl. No.: 10/836,791

(22) Filed: Apr. 30, 2004

(65) Prior Publication Data

US 2009/0297704 A1 Dec. 3, 2009

(51) Int. Cl.
*C23C 16/00* (2006.01)
(52) U.S. Cl. ...................... 427/252; 427/250
(58) Field of Classification Search ............... 427/252, 427/250
See application file for complete search history.

(56) References Cited

U.S. PATENT DOCUMENTS

| | | | |
|---|---|---|---|
| 3,779,719 A | 12/1973 | Clark at al. | |
| 3,785,854 A | 1/1974 | Baldi | |
| 3,837,894 A | 9/1974 | Tucker, Jr. | |
| 4,095,003 A | 6/1978 | Weatherly et al. | |
| 4,096,296 A | 6/1978 | Galmiche et al. | |
| 4,156,042 A * | 5/1979 | Hayman et al. | 427/253 |
| 4,526,814 A | 7/1985 | Shankar et al. | |
| 4,845,139 A | 7/1989 | Baldi | |
| 5,000,782 A | 3/1991 | Olson et al. | |
| 5,135,777 A | 8/1992 | Davis et al. | |
| 5,194,219 A | 3/1993 | Baldi | |
| 5,364,659 A | 11/1994 | Rapp et al. | |
| 5,492,726 A | 2/1996 | Rose et al. | |
| 5,492,727 A * | 2/1996 | Rapp et al. | 427/253 |
| 5,500,252 A | 3/1996 | Meelu | |
| 5,534,313 A | 7/1996 | Kung et al. | |
| 5,589,220 A | 12/1996 | Rapp et al. | |

(Continued)

FOREIGN PATENT DOCUMENTS

GB  1549845 A  8/1979
WO  PCT/US2005/014789  9/2006

OTHER PUBLICATIONS

Shatiel, Nissim, New Products Presentation, Sep. 22, 2002, Chromalloy Isreal, slides 1-5 (http://www.chromalloyisrael.com/products_6.htm).*

(Continued)

*Primary Examiner*—Fred J. Parker
*Assistant Examiner*—Kelly M Gambetta
(74) *Attorney, Agent, or Firm*—Ingrassia Fisher & Lorenz, P.C.

(57) ABSTRACT

There is provided a method for applying an improved chromium diffusion coating on an industrial item such as a turbine blade of a gas turbine engine. Chromium and other active metals are combined to form an alloy coating. Active elements include silicon, hafnium, zirconium, yttrium, tantalum, and rhenium. For producing the modified coatings through pack cementation chromium and a master alloy are mixed into a packing along with inert material and a halide activator. The packing surrounds a target in a diffusion box. The metals are then deposited by diffusion onto a target surface by pack cementation methods. The diffusion of the desired metals takes place during a coating thermal cycle. Alternatively, the diffusion can take place using an out-of-pack arrangement. Such modified coatings are utilized as improved performance coatings for environmental resistance applications over the current chromium diffusion coatings.

46 Claims, 2 Drawing Sheets

U.S. PATENT DOCUMENTS

| | | |
|---|---|---|
| 5,972,429 A | 10/1999 | Bayer et al. |
| 6,183,888 B1 | 2/2001 | Alperine et al. |
| 6,387,194 B1 | 5/2002 | Zeigler et al. |
| 6,887,519 B1 * | 5/2005 | Pillhoffer et al. ............ 427/237 |
| 6,921,251 B2 * | 7/2005 | Ackerman et al. ...... 416/241 R |

OTHER PUBLICATIONS

Bianco, Robert. et al. Pack Cementation Aluminide Coatings on Superalloys: Codeposition of Cr and Reactive Elements, J. Electrochem. Soc., vol. 140, No. 4, Apr. 1993.

* cited by examiner

CHROMIUMM DIFFUSION COATINGS

FIELD OF THE INVENTION

The present invention relates to methods and materials for forming a protective diffusion layer on metallic items. More particularly the invention relates to improved formulations that include chromium and other active elements for applying a diffusion layer on HPT components such as a turbine blade in order to improve the resistance of the turbine hardware to forces of oxidation, corrosion, and sulfidation.

BACKGROUND OF THE INVENTION

In an attempt to increase the efficiencies and performance of contemporary jet engines, and gas turbine engines generally, engineers have progressively pushed the engine environment to more extreme operating conditions. The harsh operating conditions of high temperature and pressure, in a corrosive environment, that are now frequently specified place increased demands on engine components and materials. Indeed the gradual change in engine design has come about in part due to the increased strength and durability of new materials that can withstand the operating conditions present in the modern gas turbine engine.

The turbine blade is one engine component that directly experiences severe engine conditions. Turbine blades are thus designed and manufactured to perform under repeated cycles of high stress and high temperature. An economic consequence of such a design criteria is that currently used turbine blades can be quite expensive. It is thus highly desirable to maintain turbine blades in service for as long as possible. It is correspondingly desirable to manufacture and finish turbine blades so as to withstand the corrosive and erosive forces that will attack turbine blade materials.

Turbine blades used in modern jet engines are frequently castings from a class of materials known as superalloys. The superalloys include alloys with high levels of cobalt and/or nickel. In the cast form, turbine blades made from superalloys include many desirable mechanical properties such as high strength at elevated temperature. Advantageously, the strength displayed by this material remains present even under demanding conditions, such as high temperature and high pressure. Disadvantageously, with the optimization of mechanical properties, the superalloys generally can be subject to corrosion and oxidation at the high temperature operating regime. Sulfidation can also occur in those turbine blades subject to hot exhaust gases.

Thus, it has become known to provide coatings or protective layers on items, such as turbine blades, that are subject to corrosion, erosion or sulfidation. Chromium, aluminum, and other metallic diffused coatings can be used to provide a protective layer that is more resistant to corrosion and/or oxidation than is the underlying substrate material. In the case of superalloys, materials such as platinum, aluminum, and chromium can be used to provide a protective diffusion coating.

One method used for providing diffusion coatings is the pack cementation process. In this method the target, the industrial item to be coated, is placed in a box or retort with a "pack" surrounding it. The pack typically includes a source of the metal that is to be diffused into the target, inert packing material, and an activator if any. Typically the target lies in a bed of mixed powdered materials. The box containing the target and its surrounding pack is then placed in an oven where the materials are heated for a desired time at a desired temperature. Diffusion of desired elements takes place during the thermal cycle. Pack cementation is a comparatively attractive method of coating in that it is a relatively simple method that is relatively inexpensive to apply to the target, as compared to other methods of coating superalloys.

In the pack cementation process, elemental diffusion coatings on an article is produced through essentially a chemical vapor deposition procedure. The metallic elements in the pack react with the halide activator to form halide precursors which upon transport to the articles (substrates) react with the substrate surface to form the protective coatings. The material transfer reactions at the surface involve adsorption, dissociation and the various reactions involved in coating processes can become somewhat complex. Hence, several commercially practiced coatings involving more than one elemental diffusion utilize multiple sequential steps to diffuse single elements such as Cr, Al, and Si in order to achieve duplex coatings. The situation becomes increasingly more intricate with the need to diffuse more than two elements for coating formation in a single step.

The prior art methods of providing protective coatings have experienced limitations and drawbacks. One problem that has been encountered is the inability of known diffusion methods to apply a coating that includes as well other active elements (such as Hf, Si and Y) in addition to chromium. An improved oxidation, corrosion, and sulfidation resistance can be achieved in those coatings that include silicon, hafnium, yttrium, and other materials.

Hence there is a need for a method to apply an improved active element modified chromium diffusion protective coating on a metallic item such as a turbine blade. There is a need for an improved coating method that uses combinations of materials such as chromium, silicon, hafnium, and yttrium to render increased resistance to oxidation, corrosion, and sulfidation. Moreover there is a need for an improved diffusion method that retains the cost advantages associated with known pack cementation methods. The present invention addresses one or more of these needs.

SUMMARY OF THE INVENTION

The present invention provides a method and materials for applying a improved chromium diffusion coating on a surface of a targeted industrial item such as a turbine blade. The improved coating includes chromium and other active elements such as hafnium, yttrium, nickel, and silicon. Further the coating may be applied to exterior surfaces and internal surfaces of the target item.

In one embodiment, and by way of example only, there is provided a method for diffusion coating a surface of a metallic target comprising the steps of: providing a metal powder comprising elemental chromium powder and a powder of a master alloy of hafnium, nickel, yttrium, and silicon, and wherein the metal powder has a mesh size of 140 or smaller; mixing the metal powder with an inert material; mixing a single or multiple halide activator with the metal powder; placing the metal powder, inert material, and halide activator in a diffusion box so as to form a packing that surrounds the target; heating the packing surrounded target to a temperature between approximately 1800° F. and 2050° F. and holding the temperature therebetween for between about 2 to about 5 hours thereby causing diffusion of the metals into the target surface. The diffusion box may be sealed and inert gas flowed through the diffusion box during the heating step. The packing may comprise between about 15% to about 40% combined total metal powder; between about 0.2% to about 5% halide activator, and the rest inert filler. The powder of the master alloy has a weight composition comprising about 25% to about 40% hafnium, about 5% to about 20% nickel, about 0.35% to about 10% yttrium, and the rest silicon. Encapsulated halide activators may be used.

As an alternative of the above embodiment, a single metal alloy may be used as the source of metal powder, and the metal alloy may comprise chromium and elements selected from the group consisting of silicon, hafnium, tantalum, rhenium, and yttrium.

In a further embodiment, and by way of example only, there is provided a method for diffusion coating an internal surface of a hollow metallic target comprising the steps of: providing a metal powder comprising elemental chromium powder and a powder of a master alloy of hafnium, nickel, yttrium, and silicon, and wherein the metal powder has a mesh size of 140 or smaller; mixing the metal powder with an inert material; mixing an activator with the metal powder and inert material to form a packing; placing the packing material into a diffusion box; placing a target into a diffusion box such that the target is not surrounded by the packing material (i.e., the target is out-of-pack/above the coating mix); passing an inert gas such as hydrogen through the packing and then through the hollow interior of the target; and heating the diffusion box to a temperature sufficient to cause transportation of coating precursors of the metals in the packing material into the surface on the interior of the target. The halide activator may include multiple halide compounds. The heating step may comprise heating to a temperature between approximately 1800° F. and 2050° F. and holding the temperature therebetween for between about 2 to about 5 hours. The packing may comprise between about 15% to about 40% of combined total metal powder; between about 1% to about 5% halide activator, and the rest inert filler. The powder of the master alloy has a weight composition comprising about 25% to about 40% hafnium, about 5% to about 20% nickel, about 0.35% to about 10% yttrium, and the rest silicon. Both external and internal surfaces of a hollow metallic target can be diffusion coated in the same cycle by utilizing the means herein described.

Other independent features and advantages of the method to obtain improved chromium diffusion coatings will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. Reference will now be made in detail to exemplary embodiments of the invention, examples of which are illustrated in the accompanying drawings. Wherever possible, the same reference numbers will be used throughout the drawings to refer to the same or like parts.

It has now been discovered that an improved chromium diffusion coating can be applied to an industrial item such as a turbine blade. In summary, chromium, in combination with other desirable metals, are deposited by diffusion onto a surface by pack cementation methods. The metals, whether in their individual elemental form, or in alloyed combination together, are powdered and placed in a diffusion packing. The diffusion of the desired metals takes place during the thermal cycle employed for coating formation.

In one preferred embodiment a diffusion packing is prepared using chromium or chromium alloy powder, master alloy powders of active elements and/or active metal elements in elemental or alloy form, a single or multiple activator, and an inert filler. Preferably the metallic powders that are used have a mesh size equal to or below 140 mesh. The metallic powders comprise the individual elemental metals or alloys thereof.

The metals in the pack include chromium and master alloy powders consisting of the desired active elements. The chromium source may be elemental chromium or chromium alloy. Preferably a high purity chromium powder is used. Active elements may include silicon, hafnium, zirconium, yttrium, tantalum, and rhenium. Again these active elements can be present in elemental form, or in alloy form, or a combination of both. Preferably all metal sources, whether elemental or alloy, are present in a flowable powder under 140 mesh size.

In one embodiment, master alloys of a desired metallic composition are first prepared. The alloy composition includes those metallic elements that are desired to be co-deposited by the diffusion process. Once the alloy is formed, for example in ingot form, the solid alloy can be ground or pulverized in order to create the powder to be used in the packing. The solid alloy may thus be pulverized to a desired particle size suitable for the diffusion process. The master alloy powders can also be produced through the conventional atomization techniques used for powder production from molten alloys. In a further embodiment, it is preferred to combine an elemental chromium powder with a powder of a master alloy formulated to contain desired active elements.

Preferred activators include halide sources such as sources of fluorine, chlorine, iodine, and bromine. Acceptable activators include ammonium chloride, ammonium iodide, ammonium bromide, ammonium fluoride, ammonium bifluoride, elemental iodine, elemental bromine, hydrogen bromide, aluminum chloride, aluminum fluoride, aluminum bromide, and aluminum iodide. Preferred activators include ammonium chloride ($NH_4Cl$) and ammonium fluoride ($NH_4Fl$), and ammonium bifluoride.

In one embodiment it is preferred to use dual activators, that is, both a fluorine and a chlorine source within the same pack. Concentration of the halide source within the packing may be up to 20% by weight, and more preferably is up to 8% by weight. In one preferred embodiment, the halide concentration is between approximately 1% and approximately 5% by weight. Optionally, multiple activators may be various combinations of the identified halide compounds.

In one embodiment an activator is included in the packing that is in an encapsulated form. Such encapsulated activators are available from Chromalloy Israel, Ltd, Israel. An encapsulated activator is an activator, such as a halide compound, with a covering that surrounds the activator. The encapsulation thus acts to protect the halide from the surrounding environment and also minimizes any reactions the halide compounds might otherwise undergo. The encapsulating material, typically an organic polymer, evaporates during heating at which time the halide compound is released to participate in the diffusion process. A practical advantage of using the encapsulated form of activator is that it extends the useful shelf life of a packing. Thus a packing can be mixed, prepared, or manufactured at one location and then distributed to repair facilities. The packing can then be stored at the repair facilities until needed without losing its effectiveness.

Inert materials include metal oxides such as alumina $Al_2O_3$. Other preferred inert materials include kaolin, MgO, $SiO_2$, $Y_2O_3$ or $Cr_2O_3$. The inert fillers may be used singly or in combination. Preferably the inert materials have a non-sintered, flowable grain structure so as not to interfere with the gas transport diffusion of the desired metals.

The packing of the present invention can have varying concentrations of the metallic components within them. In one embodiment, the chromium concentration is between about 5 to about 20%; and the master alloy powder consisting of active elements (Hf, Si, Y, and others) is between about 1% to about 20% by weight. In another embodiment the chromium concentration is between about 5% to about 20%, silicon is between about 0.5% to about 10%; hafnium is between about 0.5 to about 8%; yttrium is between about 0.05 to about 5.0%; and other elements are between about 0 to about 5%, where the other elements include refractory elements such as tantalum, rhenium, zirconium etc. Also to be included are alloys of these metals.

It is also included within the scope of the invention to use mixtures of about 5% to about 20% chromium, about 1.0% to about 20% master alloy powder 0 to about 5.0% of active elements (Hf, Si, and Y), and 0 to about 5% refractory elements Ta, Re, and Zr.

These percentages are measured on a weight percentage basis comparing the metal to metal concentrations. As a whole, the metal component in the packing for coating (which includes activator and inert materials) can be between about 10% to about 90% with a range of about 15% to about 25% being preferred.

Other preferred embodiments of the active element composition include alloys of chromium, hafnium, nickel, yttrium, and silicon. Alternatively, a desired formulation can be created by combining chromium powder with a powdered master alloy of hafnium, nickel, yttrium, and silicon. Preferred formulations of these embodiments are based on a pack composition comprising approximately 15 to 40% by total weight metal or metal alloy powder, approximately 1 to 5% by weight activator, and the rest inert material such as alumina. A preferred formulation comprises approximately 20% by weight metal powder, approximately 2% activator, and the rest inert material. Some preferred compositions of the active element component are as follows, with weight percentages being approximate:

| | Nominal Composition of Master Alloy | | | | |
|---|---|---|---|---|---|
| | A | B | C | D | E |
| Hf | 25% | 30% | 40% | 30% | 40% |
| Ni | 5% | 10% | 15% | 15% | 20% |
| Y | 0.5% | 0.5% | 0.5% | 5.0% | 10% |
| Si | bal. | bal. | bal. | bal. | bal. |

Chromium is then added to these compositions to reach a desired level of total metal in the alloy or in the pack, such as between 15% and 40%. In a preferred embodiment, master alloys of hafnium, nickel, yttrium, and silicon are prepared. Powders of this alloy are then combined with chromium powder as the metal additive in the pack.

A further embodiment adds additional materials such as zirconium, rhenium, and tantalum. These metals can be added up to 5% by weight in formulations A, B, C, D and E. Preferably these materials are included in the same alloy as that including hafnium, nickel, yttrium, and silicon.

It is within the scope of the invention to provide metal powder that is either elemental of each metal or is an alloy of metals. Further the combination of metals in elemental form with metals in alloy form can be adjusted to affect the thermodynamic activity with respect to a given halide activator or activators. Metals in their elemental form tend to have a higher activity for the formation of halide precursors. Elements in the master alloy powders tend to provide a lower activity. Thus, for example if it is desired to increase the diffusion of a given metal, it can be added to the pack in elemental form.

The Argonne National Laboratory Publication ANL-5750 on "The Thermochemical Properties of the Oxides, Fluorides and Chlorides to 2500° K" by Alvin Glassner and the publication "Thermodynamic Properties of Halides" by L. B. Pankratz, United States Department of the Interior, Bureau of Mines, Bulletin 674 provide useful information of relevance to free energy of formation and thermochemical properties of halides, which are elements of interest in coating formation. Table I (below) lists estimated free energy of formation values around 1340° K (about 1950° F.) coating temperature for some halides of elements of current interest. When dual activators such as chlorides and fluorides are used, it can be noticed from the listed values that the Yttrium and Hafnium chlorides exhibit energy values which are similar in magnitude to those of chromium fluorides. Thus with the aid of pure elements (with unit activities) and master alloy make-ups (with lowered activities of elemental metals) and use of single or multiple activators, that the halides of chromium, hafnium, silicon and yttrium are formed. They generate comparable vapor pressures for co-deposition of these metals on the substrates through the various metal transfer mechanisms.

TABLE I

ESTIMATED FREE ENERGY OF FORMATION
Kcal/gram-atom of halide at 1340° K.

| Halide | Estimated Value (negative quantity) |
|---|---|
| $SiF_4$ | 82 |
| $HfF_4$ | 86 |
| $HfF_2$ | 90 |
| $HfF_3$ | 92 |
| $YF_3$ | 108 |
| $CrF_5$ | 56 |
| $CrF_4$ | 56 |
| $CrF_3$ | 65 |
| $CrF_2$ | 68 |
| $SiCl_4$ | 26 |
| $HfCl_4$ | 48 |
| $HfCl_3$ | 49 |
| $HfCl_2$ | 52 |
| $YCl_3$ | 58 |
| $CrCl_4$ | 17 |
| $CrCl_3$ | 23 |
| $CrCl_2$ | 28 |

The mixing step for making a packing composition can take place using various kinds of equipment. For small batches, the mixing step using equipment such as a mixer found in an industrial laboratory is sufficient. For larger batches industrial-sized mixers may be preferred.

Having described the invention from a structural standpoint, a method of using the invention is now described.

Figure 1:
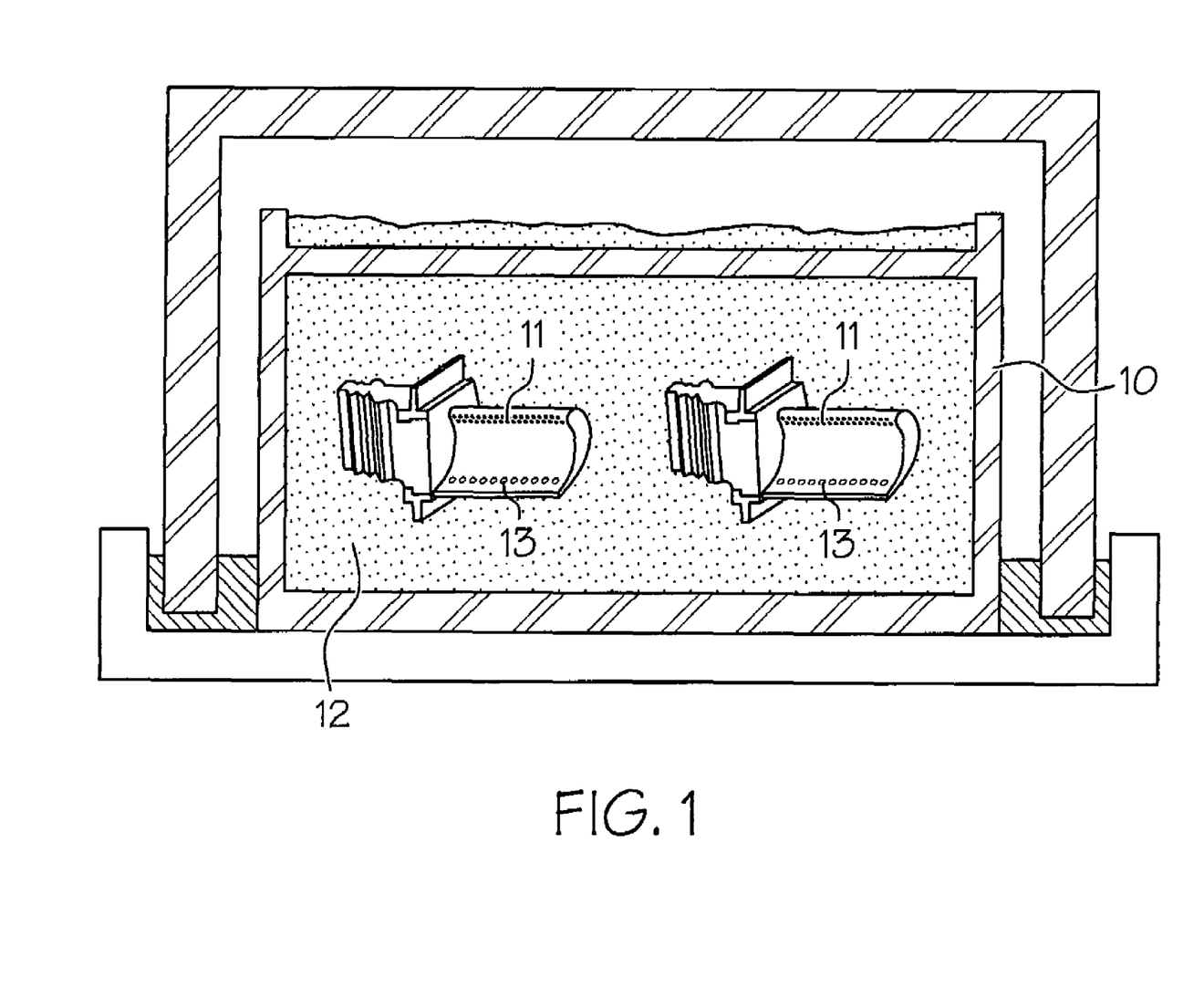
FIG. 1 is a perspective view of an apparatus used in the pack cementation method according to an embodiment of the present invention.

The packings of the present invention are intended for use with known pack cementation methods. Referring now to FIG. 1 there is shown an illustration of pack cementation equipment for use with the present invention. A retort or box 10 provides a closed container in which the target item rests. Box 10 may include a lid or other opening. If desired the lid may be affixed to the box structure as by welding so as to preclude the entrance of oxygen. Target 11 is placed within box 10. Box 10 and lid are composed of materials such as wrought nickel based superalloys or stainless steel metal capable of withstanding heating to elevated temperatures.

The target item that is to be coated may receive a surface preparation in order to facilitate the diffusion process. The preparation may include an inspection, degreasing, and blast cleaning. Further the part may be rinsed with an evaporative solvent to remove any remaining particulate residues and contaminants.

The target 11, such as a turbine blade, is placed in the box 10. A pack 12 is also placed within box 10 such that pack 12 surrounds target 11. Pack 12 includes metal powder, activators, and inert materials of the kinds and quantities as above-described. Pack 12 further acts to support target 11 so that the target is surrounded by metals in the pack.

In an alternative embodiment, dual activators are used in which a first activator and a second activator are included in the pack. In a preferred embodiment, the first activator comprises a first halide compound, such as a chlorine-containing compound, and the second activator comprises a second halide, such as a fluorine-containing compound. Use of the dual halides can advantageously benefit the thermodynamics and reaction kinetics of the different metals also present in the pack. Thus chlorine will serve to assist the activation of one species and fluorine can assist the activation of another species.

Once the materials for the pack 12 have been selected and assembled, and the target item has been prepared for diffusion, the materials may be placed in box 10 and sealed. A coating thermal cycle then takes place. The coating heat treatment includes heating the box and contents to the coating temperature at a controlled heat up rate and holding at a constant temperature, up to 2100° F. for up to ten hours. A preferred heat treatment is heating to a constant coating temperature between about 1800° F. to about 2050° F. for two to four hours.

During the heat treatment a mass transport and diffusion process takes place. Metal ions such as chromium react with halide ions. These molecules migrate to the surface of the target through gas transport process. At the surface of the metallic target various metal transfer mechanisms occur, for example, a metal ion such as chromium diffuses with the materials in the target substrate. Temperature and time affect the kinetics of this process. It is also preferred to carry out the heat treatment under an inert atmosphere, hydrogen, or vacuum. In some embodiments argon or hydrogen can be flowed through the box in order to maintain an acceptable atmosphere and to assist with mass transport mechanisms.

In a further embodiment, the improved chromium diffusion coating can be obtained using an "out-of-pack" coating process. This embodiment is particularly suited for providing coatings on surfaces of the internal regions of turbine blades. Referring again to FIG. 1, often targets 11 such as turbine blades include openings or passages 13 that provide fluid communication between the exterior of the turbine blade and its hollow interior regions. During engine operation air passes through the interior for cooling purposes. However, this passage of air can also lead to corrosion, oxidation, and sulfidation of the metal of the turbine blade. Thus it is desired to coat these internal passage areas. Given the small passages between the exterior and interior of a turbine blade, a traditional in-pack cementation apparatus may not be able to provide adequate vapor phase materials that efficiently reach the interior of the turbine blade. Thus the diffusion coating on a turbine blade interior that results from a traditional pack cementation is often less than desired. An alternative arrangement, an out-of-pack diffusion is thus preferred to diffusion coat the interior of a turbine blade.

Figure 2:
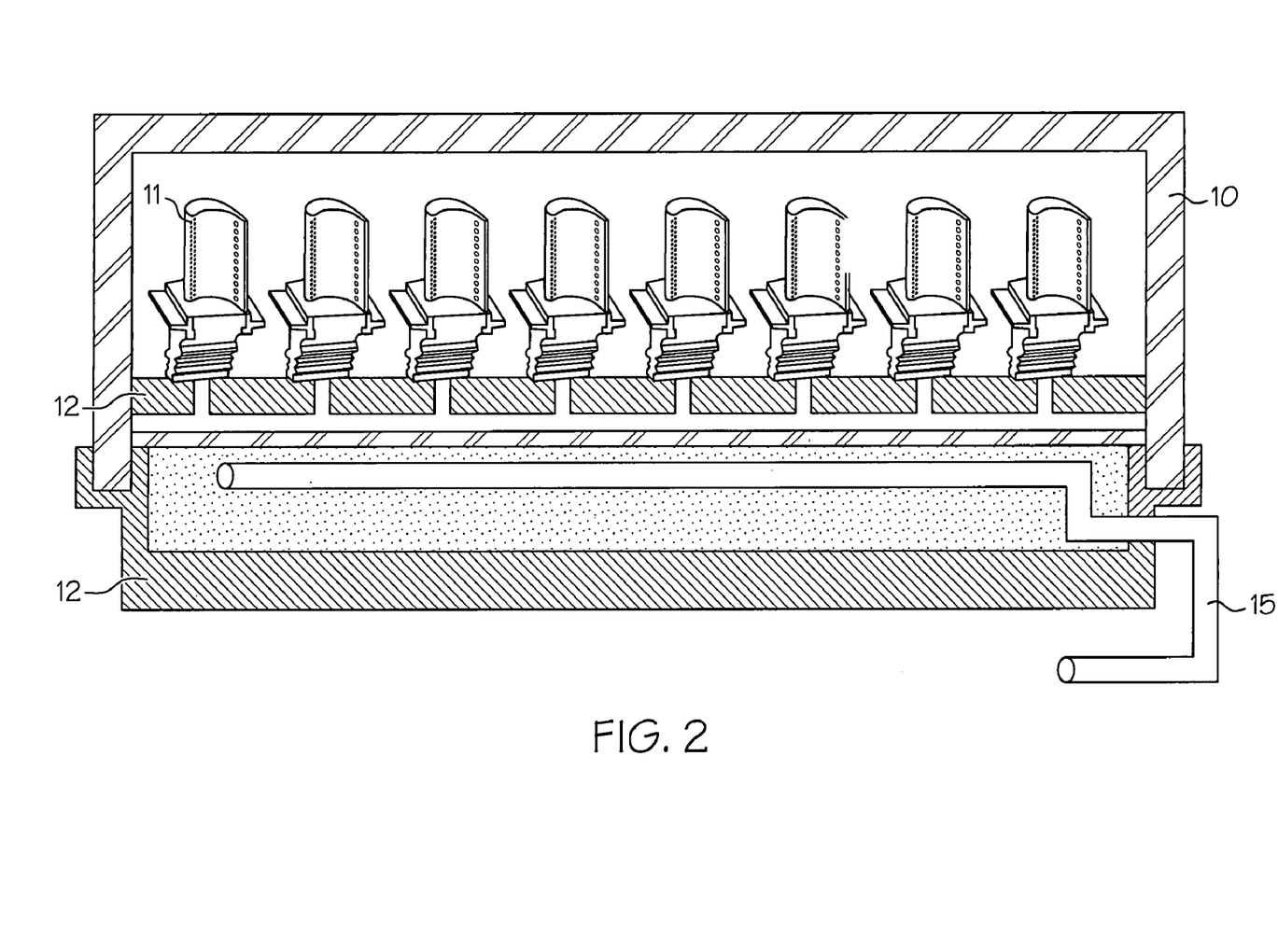
FIG. 2 is a perspective view of an apparatus used in the out-of-pack diffusion method according to an embodiment of the present invention.

Referring now to FIG. 2 in an out-of-pack process, diffusion gases are flowed through a space to receive a coating. A typical arrangement includes a box 10, target 11, and packing 12. Target 11 is typically positioned so that it is within box 10 but above, or "out of" the packing 12. Additionally an out-of-pack arrangement includes tubing 15. Tubing 15 is a ductwork or series of passageways that provides fluid communication between packing 12 and target 11. Tubing 15 includes openings (not shown) through which gases generated from packing 12 may pass into tubing 15. Tubing 15 further includes leads that direct gases into the interior of a target 11. An inert gas and/or flows through tubing 15 thereby carrying the gases from the packing to target 11. Thus, in the example of a turbine blade, gases are passed into turbine blade passageways and through the hollow interior of the turbine blade.

In an out-of-pack process, packing 12 still includes the desired metals, activator, and inert material. When the box 10 is heated, the activator and metals react to form gases such as metal halides. These gases are drawn into tubing 15 and passed into the interior of target 11. When gases enter target 11 surface diffusion takes place such that the desired metals are diffused into the internal surfaces of target 11.

The heating step in an out-of-pack diffusion process is similar to that of a traditional pack cementation apparatus. The pack and target are heated to a desired temperature, between 1800° F. and 2050° F. and the temperature is held constant for a desired period of time. Preferably this is between 2 to 5 hours.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method for diffusion coating a surface of a metallic target comprising the steps of:

providing a metal alloy comprising chromium and at least two element selected from the group consisting of silicon, hafnium, tantalum, rhenium, and yttrium;

converting the metal alloy to a metal alloy powder form;

blending a packing material comprising the metal alloy powder, a halide activator, and an inert material;

placing the packing material into a diffusion box;

placing a target into a diffusion box such that the target is surrounded by the packing material; and heating the diffusion box to a temperature sufficient to cause diffusion of metals from the metal alloy powder in the packing material into the surface of the target.

2. The method according to claim 1 wherein the step of blending a packing material further comprises blending a packing material comprising a first halide compound and a second halide compound.

3. The method according to claim 2 wherein the first halide compound is a chlorine source and the second halide compound is a fluorine source.

4. The method according to claim 2 further comprising a compound that provides a halide source that is either bromine or iodine.

5. The method according to claim 1 wherein the step of heating further comprises heating to a temperature between approximately 1800° F. and 2050° F. and holding the temperature therebetween for between about 2 to about 5 hours.

6. The method according to claim 1 wherein the halide activator that is blended during the blending step is an encapsulated halide activator.

7. The method according to claim 1 wherein the step of providing a metal alloy comprises providing a metal alloy comprising chromium, hafnium, nickel, yttrium, and silicon and wherein the total metal powder comprises between about 15 to about 40% of the packing.

8. The method according to claim 7 wherein the packing comprises between about 15% to about 40% metal alloy powder; between about 1% to about 5% halide activator, and the rest inert filler.

9. The method according to claim 7 wherein metal powder has a weight composition comprising about 5% to about 8% hafnium, about 1% to about 3% nickel, about 0.1% to about 0.35 yttrium, about 14.9% to about 8.8% silicon, and the balance chromium.

10. A method for diffusion coating a surface of a metallic target comprising the steps of:
providing a metal powder comprising elemental chromium powder and a powder of a master alloy of hafnium, nickel, yttrium, and silicon, and wherein the metal powder has a mesh size of 140 or smaller;
mixing the metal powder with an inert material;
mixing a halide activator with the metal powder and binder material;
placing the metal powder, inert material, and halide activator in a diffusion box so as to form a packing that surrounds the target; and
heating the packing surrounded target to a temperature between approximately 1800° F. and 2050° F. and holding the temperature therebetween for between about 2 to about 5 hours thereby causing diffusion of the metals into the target surface.

11. The method according to claim 10 further comprising the step of sealing the diffusion box.

12. The method according to claim 10 further comprising the step of providing a flow of hydrogen through the diffusion box during the heating step.

13. The method according to claim 10 wherein the packing comprises between about 15% to about 40% metal powder; between about 1% to about 5% halide activator, and the rest inert filler.

14. The method according to claim 10 wherein the packing comprises about 20% metal powder, about 2% halide activator, and the rest inert filler.

15. The method according to claim 10 wherein the powder of the master alloy has a weight composition comprising about 25% to about 40% hafnium, about 5% to about 20% nickel, about 0.5% to about 10% yttrium, and the rest silicon.

16. The method according to claim 15 wherein the powder further comprises up to 5% of a metal selected from the group consisting of rhenium, tantalum, zirconium, and combinations thereof.

17. The method according to claim 10 wherein the powder of the alloy has a weight composition comprising about 25% hafnium, about 5% nickel, about 0.5% yttrium, and the rest silicon.

18. The method according to claim 10 wherein the powder of the alloy has a weight composition comprising about 30% hafnium, about 10% nickel, about 0.5% yttrium, and the rest silicon.

19. The method according to claim 10 wherein the powder of the alloy has a weight composition comprising about 40% hafnium, about 15% nickel, about 0.5% yttrium, and the rest silicon.

20. The method according to claim 10 wherein the powder of the alloy has a weight composition comprising about 30% hafnium, about 15% nickel, about 5.0% yttrium, and the rest silicon.

21. The method according to claim 10 wherein the powder of the alloy has a weight composition comprising about 40% hafnium, about 20% nickel, about 10% yttrium, and the rest silicon.

22. The method according to claim 10 wherein the step of mixing a halide activator further comprises mixing an encapsulated halide activator.

23. A method for diffusion coating an internal surface of a hollow metallic target comprising the steps of:
providing a metal alloy comprising chromium and at least one element selected from the group consisting of platinum, aluminum, hafnium, tantalum, rhenium, and yttrium;
converting the metal alloy to metal powder form with mesh size of 140 or less;
mixing the metal powder with an inert material;
mixing an activator with the metal powder and inert material to form a packing;
placing the packing material into a diffusion box;
placing a target into a diffusion box such that the target is not surrounded by the packing material;
passing an inert gas through the packing and then through the hollow interior of the target; and
heating the diffusion box to a temperature sufficient to cause diffusion of the metals in the packing material into the surface on the interior of the target.

24. The method according to claim 23 wherein the step of blending a packing material further comprises blending a packing material comprising a first halide compound and a second halide compound.

25. The method according to claim 24 wherein the first halide compound is a chlorine source and the second halide compound is a fluorine source.

26. The method according to claim 24 further comprising a compound that provides a halide source that is either bromine or iodine.

27. The method according to claim 23 wherein the step of heating further comprises heating to a temperature between approximately 1800° F. and 2050° F. and holding the temperature therebetween for between about 2 to about 5 hours.

28. The method according to claim 23 wherein the activator that is mixed during the step of mixing an activator with the metal powder and inert material is an encapsulated halide activator.

29. The method according to claim 23 wherein the step of providing a metal alloy comprises providing a metal alloy comprising chromium, hafnium, nickel, yttrium, and silicon and wherein the metal powder comprises between about 15 to about 40% of the packing.

30. The method according to claim 29 wherein the packing comprises between about 15% to about 40% metal alloy powder; between about 1% to about 5% halide activator, and the rest inert filler.

31. The method according to claim 29 wherein metal powder has a weight composition comprising about 5% to about 8% hafnium, about 1% to about 3% nickel, about 0.1% to about 0.35 yttrium, about 14.9% to about 8.8% silicon, and the balance chromium.

32. A method for diffusion coating an internal surface of a hollow metallic target comprising the steps of:
providing a metal powder comprising elemental chromium powder and a powder of a master alloy of hafnium, nickel, yttrium, and silicon, and wherein the metal powder has a mesh size of 140 or smaller;
converting the metal alloy to metal powder form with mesh size of 140 or less;
mixing the metal powder with an inert material;
mixing an activator with the metal powder and inert material to form a packing;
placing the packing material into a diffusion box;
placing a target into a diffusion box such that the target is not surrounded by the packing material;
passing a hydrogen through the packing and then through the hollow interior of the target; and
heating the diffusion box to a temperature sufficient to cause diffusion of the metals in the packing material into the surface on the interior of the target.

33. The method according to claim 32 wherein the step of blending a packing material further comprises blending a packing material comprising a first halide compound and a second halide compound.

34. The method according to claim 32 wherein the first halide compound is a chlorine source and the second halide compound is a fluorine source.

35. The method according to claim 32 further comprising a compound that provides a halide source that is either bromine or iodine.

36. The method according to claim 32 wherein the step of heating further comprises heating to a temperature between approximately 1800° F. and 2050° F. and holding the temperature therebetween for between about 2 to about 5 hours.

37. The method according to claim 32 wherein the activator that is mixed during the step of mixing an activator with the metal powder and inert material is an encapsulated halide activator.

38. The method according to claim 32 wherein the packing comprises between about 15% to about 40% metal powder; between about 1% to about 5% halide activator, and the rest inert filler.

39. The method according to claim 32 wherein the packing comprises about 20% metal powder, about 2% halide activator, and the rest inert filler.

40. The method according to claim 32 wherein the powder of the master alloy has a weight composition comprising about 25% to about 40% hafnium, about 5% to about 20% nickel, about 0.5% to about 10% yttrium, and the rest silicon.

41. The method according to claim 32 wherein the powder further comprises up to 5% of a metal selected from the group consisting of rhenium, tantalum, zirconium, and combinations thereof.

42. The method according to claim 32 wherein the powder of the alloy has a weight composition comprising about 25% hafnium, about 5% nickel, about 0.5% yttrium, and the rest silicon.

43. The method according to claim 32 wherein the powder of the alloy has a weight composition comprising about 30% hafnium, about 10% nickel, about 0.5% yttrium, and the rest silicon.

44. The method according to claim 32 wherein the powder of the alloy has a weight composition comprising about 40% hafnium, about 15% nickel, about 0.5% yttrium, and the rest silicon.

45. The method according to claim 32 wherein the powder of the alloy has a weight composition comprising about 30% hafnium, about 15% nickel, about 5.0% yttrium, and the rest silicon.

46. The method according to claim 32 wherein the powder of the alloy has a weight composition comprising about 40% hafnium, about 20% nickel, about 10% yttrium, and the rest silicon.

* * * * *

UNITED STATES PATENT AND TRADEMARK OFFICE
CERTIFICATE OF CORRECTION

| | | |
|---|---|---|
| PATENT NO. | : 7,645,485 B2 | Page 1 of 1 |
| APPLICATION NO. | : 10/836791 | |
| DATED | : January 12, 2010 | |
| INVENTOR(S) | : Murali Madhava | |

It is certified that error appears in the above-identified patent and that said Letters Patent is hereby corrected as shown below:

On the Title page,
Item (54), "CHROMIUMM DIFFUSION COATINGS" should be changed to --CHROMIUM DIFFUSION COATINGS--.

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,645,485 B2  Page 1 of 1
APPLICATION NO. : 10/836791
DATED : January 12, 2010
INVENTOR(S) : Murali Madhava

It is certified that error appears in the above-identified patent and that said Letters Patent is hereby corrected as shown below:

On the Title page, Item (54) and at Column 1, line 1, the title,
"CHROMIUMM DIFFUSION COATINGS" should be changed to --CHROMIUM DIFFUSION COATINGS--.

This certificate supersedes the Certificate of Correction issued March 23, 2010.

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,645,485 B2  
APPLICATION NO. : 10/836791  
DATED : January 12, 2010  
INVENTOR(S) : Murali Madhava Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1296 days.

Signed and Sealed this

Sixteenth Day of November, 2010

David J. Kappos  
*Director of the United States Patent and Trademark Office*